United States Patent Office 2,781,355
Patented Feb. 12, 1957

2,781,355
IMIDAZOLINE DERIVATIVES AND PROCESS

Hans S. Mannheimer, New York, N. Y., assignor to John J. McCabe, Jr., and Hans S. Mannheimer, as joint venturers No Drawing. Application March 26, 1956,
Serial No. 573,632

13 Claims. (Cl. 260—309.6)

This invention relates to novel compositions and to methods for producing them. In one of its more specific aspects, the invention is directed to novel derivatives of that class of compounds which may be prepared by following the methods described in my copending application, Serial No. 521,393, filed July 11, 1955 and having the following general Formula I:

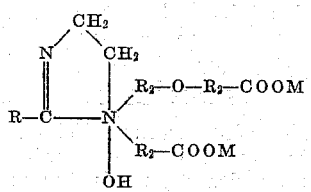

in which R is a hydrocarbon radical of 4–18 carbon atoms; $R_2$ is selected from the class consisting of (a) aliphatic hydrocarbon groups of 1–4 carbon atoms, (b) hydroxy substituted hydrocarbon groups of 1–4 carbon atoms, (c) aliphatic ether groups, each of said groups having a single ether linkage therein and otherwise being hydrocarbon of 2–4 carbon atoms, (d) aliphatic ether groups, each of said groups having a single ether linkage therein and otherwise being hydroxy substituted hydrocarbon of 2–4 carbon atoms, (e) aliphatic keto groups, each of said groups having a single keto linkage therein and otherwise being hydrocarbon of 2–4 carbon atoms, (f) aliphatic keto groups, each of said groups having a single keto linkage therein and otherwise being hydroxy substituted hydrocarbon of 2–4 carbon atoms; M is an alkali metal and preferably sodium or potassium which are obvious equivalents.

Said compounds of Formula I may be derived from the metal salts of substituted quaternary hydroxy cycloimidinic acid metal alcoholates, examples of which are disclosed in my U. S. Patent 2,528,378, and which I shall hereinafter refer to as "cycloimidates." Said "cycloimidates" having the following general formula:

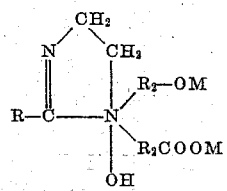

R, $R_2$ and M have heretofore been defined. The methods for producing said "cycloimidates" and illustrative examples of a number of said "cycloimidates" are all of the "cycloimidates" disclosed in said patent which is made part hereof.

One of the methods described in said patent for the production of said "cycloimidates" is to first produce a cycloimidine by reacting one mole of a monocarboxylic acid, having at least 4 and preferably 4–18 carbon atoms in its radical connected to its COOH group, with one mole of aminoethylethanolamine, known in said patent and herein as reactant A. Then one mole of said cycloimidine is reacted with one mole of a monohalocarboxylic acid, such as monochloracetic acid, monochlorpropionic acid, monochlorlactic acid, etc. in the presence of a fixed proportion of caustic soda, all described in said patent, to produce said "cycloimidates." Such "cycloimidates" are produced because of the marked preferential of the reactants and because of the mole proportion of reactants being one to one.

As disclosed in my application 521,393, said "cycloimidates," under certain controlled conditions, may be reacted with one of said monohalocarboxylic acids to replace the metallic element M of the $R_2$—OM group thereof with an $R_2$—COOM group.

Still another method which may be employed to produce said compounds of Formula I is to heat together at approximately 100° C. one mole proportion of said cycloimidine and an aqueous solution at a pH of about 13 produced by previously combining at a temperature no greater than 20° C. 2 moles of said monohalocarboxylic acids, having 1–4 carbon atoms in its hydroxy substituted hydrocarbon group, such as $CH_2CHOH$ or in its unsubstituted hydrocarbon group, such as $CH_2$, $C_2H_4$, $C_3H_6$, $C_4H_8$, and approximately 4.5–5 moles of caustic soda. The mass is maintained at said temperature of approximately 100° C. until the pH thereof decreases to the range of approximately 8.8–9.3.

The following are illustrative examples given merely for the purposes of specifically illustrating how some of the compounds of Formula I may be produced, all parts being given by weight unless otherwise specified:

EXAMPLE A 200 parts of lauric acid and 104 parts of reactant A are placed in a reacting vessel and are heated sufficiently to melt the lauric acid whereupon an agitator located therein is started and mixes and maintains these components in mixed condition. While being constantly agitated the mix is heated under vacuum of about 110 mm. pressure for about 3 hours while gradually raising the temperature to 170° C. During this period 18 parts of water have been distilled off. Then the temperature of the entire mass is gradually raised to 220° C. over a period of about 2 hours while the mercury pressure has been decreased to a value no greater than 30 mm. Under these conditions 18 more parts of water are distilled off leaving behind in the reaction mass a 100% pure product which is a disubstituted cycloimidine which is a light colored viscous liquid at room temperature. Then this reaction product is allowed to cool to room temperature and the entire mass is added to a previously prepared solution produced by adding 192 parts of monochloracetic acid and 180 parts of caustic soda to 600 parts of water. This solution was prepared and maintained at a temperature below 20° C. before the addition of said disubstituted cycloimidine. This mixture is heated to 100° C. and maintained at this temperature for 2 hours. During this period the pH of the mix is reduced from approximately 13 to 8.8–9.3. At the end of this period the pH of this mass is no longer subject to change by continued heating at said temperature and a sample of the resultant product is water soluble to a sparkling clear solution. At the end of this period the mass consists chiefly of a water solution of a compound hereinafter known as product A and having the following formula:

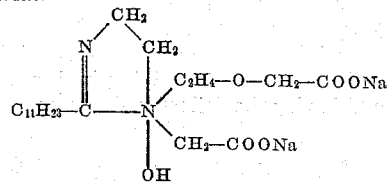

EXAMPLE A-1

200 parts of lauric acid and 104 parts of reactant A are placed in a reacting vessel and are heated sufficiently to melt the lauric acid whereupon an agitator located therein is started and mixes and maintains these components in mixed condition. While being constantly agitated the mix is heated under vacuum of about 110 mm. pressure for about 3 hours while gradually raising the temperature to 170° C. During this period 18 parts of water have been distilled off. Then the temperature of the entire mass is gradually raised to 220° C. over a period of about 2 hours while the mercury pressure has been decreased to a value no greater than 30 mm. Under these conditions 18 more parts of water are distilled off leaving behind in the reaction mass a 100% pure product which is a disubstituted cycloimidine which is a light colored viscous liquid at room temperature. Then this reaction product is allowed to cool to room temperature and the entire mass is added to a previously prepared solution produced by adding 96 parts of monochloracetic acid and 90 parts of caustic soda to 300 parts of water. This solution was prepared and maintained at a temperature below 20° C. before the addition of said disubstituted cycloimidine. This mixture is heated to 95° C. and maintained at this temperature for 2 hours. During this period the pH of the mix is reduced from approximately 13 to 8–8.5. At the end of this period the pH of this mass is no longer subject to change by continued heating at said temperature and a sample of the resulting product is water-soluble to a sparkling clear solution which clouds upon standing. Then to said reaction mass there is added 25 additional parts of caustic soda dissolved in 21 parts of water and heating is continued to maintain said mass at about 95° C. for an additional 1 hour.

At the end of that period said mass, known as mass X, is cooled to room temperature and then there is added thereto a previously prepared solution produced by adding 96 parts of monochloracetic acid and 80 parts of caustic soda into 300 parts of water while maintaining same at a temperature no greater than 20° C. and preferably at about 15° C. The resultant mixture of said mass and said solution is then heated to and maintained at about 100° C. for about 1–2 hours. In that period, the pH of the resultant product will have been reduced from approximately 13, that of the original mixture, to approximately 8.8–9.3. Then the resultant product is cooled to room temperature and consists chiefly of an aqueous solution of a reaction product, identical with that of Example A, with the amount of water in said solution being slightly greater than that of the solution thereof in Example A.

EXAMPLE B

All of mass X of Example A–1 may be cooled to room temperature and there is then added thereto a solution consisting of 40 parts of caustic soda dissolved in 40 parts of water. Then to said mixture there are added 80.5 parts of chlorhydrin. This mixture is heated over a period of 1 hour to 95° C. The mass is subsequently maintained at this temperature of 95° C. until there is no change in pH, this taking approximately 2 to 3 hours.

The resultant mass is then cooled to room temperature and mixed with a previously prepared solution produced by changing 96 parts of monochloracetic acid and 80 parts of caustic soda into 300 parts of water while being maintained at about 15° C. The mixture is then heated to and maintained at about 100° C. for 1–2 hours. At the end of this period the mass consists chiefly of an aqueous solution of a compound hereinafter known as product B and having the following formula:

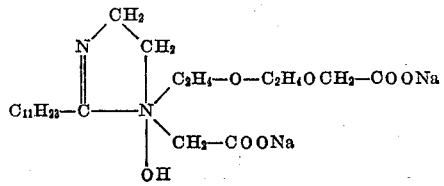

EXAMPLE C 172 parts of capric acid and 104 parts of reactant A are heated and reacted under the same condition as given in Example A, and 240 parts of the disubstituted cycloimidine produced thereby are introduced into a solution of 220 parts of monochlorpropionic acid and 190 parts of caustic soda in 500 parts of water prepared and maintained below 20° C. The resulting mixture is then heated under the same conditions as outlined in Example A until the resulting product forms sparkling clear aqueous solutions and is no longer subject to pH change in continued heating. The mass consists chiefly of an aqueous solution of a compound hereinafter known as product C and having the following formula:

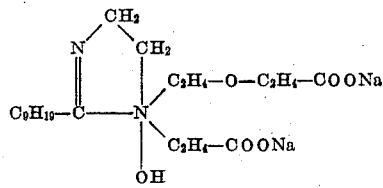

EXAMPLE D 282 parts linseed fatty acid and 104 parts reactant A are treated in the same manner as described in Example A. The entire reaction product is then processed with an aqueous solution of 192 parts monochloracetic acid and 180 parts of caustic soda previously made and maintained below 20° C. and subsequently processed in the manner of Example A to produce reaction product hereinafter known as product D and having the same formula as that of Example A, except that $C_{17}H_{31}$ is substituted for $C_{11}H_{23}$ therein.

EXAMPLE E 116 parts of caproic acid and 104 parts of reactant A are condensed in the manner as described in the previous examples and the resulting reaction product is subsequently processed in the same manner as that set forth in the processing of the disubstituted cycloimidine of Example D. The reaction product is hereinafter known as product E and has the same formula as that of Example A, except that $C_5H_9$ is substituted for $C_{11}H_{23}$ therein.

EXAMPLE F 284 parts of stearic acid and 104 parts of reactant A are heated in the like manner as described in previous examples, and the resulting reaction product is then introduced into an aqueous solution of 220 parts monochlorpropionic acid and 190 parts of caustic soda. The process is carried out in the same manner as described in the previous Example A and there is produced a product hereinafter known as product F and having the same formula as that of Example C, except that $C_{17}H_{35}$ is substituted for $C_9H_{19}$ therein.

EXAMPLE G 290 parts dodecyl benzoic acid and 104 parts of reactant A are condensed in the manner described in Example D and the resultant product is processed in the manner of Example D wherein there is produced a compound hereinafter known as product G and having the same formula as that of Example A, except that $$C_{12}H_{25}C_6H_4$$

is substituted for $C_{11}H_{23}$ therein.

EXAMPLE H 228 parts of myristic acid and 104 parts reactant A are reacted in the manner described in Example D and the resultant product is processed in the manner of Example D whereby there is produced a novel compound having the same formula as that of Example A, except that $C_{13}H_{27}$ is substituted for $C_{11}H_{23}$ therein.

EXAMPLES I-M

One mole proportion of the respective "cycloimidates" described in Examples 10-14 of said Patent 2,528,378 are mixed with aqueous solution prepared at 18° C. by the addition of 1 mole proportion of monochloracetic acid and about 2 moles proportion of caustic soda in about 30 moles of water and such mixtures are maintained at about 100° C. for approximately 2 hours whereupon the pH thereof decreases from 13 to about 8.8-9.3 to provide compounds which are the same as those of Examples 10-14 of said patent except that the sodium atom of the R—ONa groups thereof are replaced by —CH₂—COONa, and an illustrative example of this is such group of Example 10 having its sodium atom so replaced to become CH₂CHOHCH₂OCH₂COONa.

A large number of other specific compounds may be produced by using starting compounds other than those defined in any of the aforesaid examples and differing therefrom in the radical R. Also other specific compounds may be produced by using a monohalocarboxylic acid other than the specific ones employed in the aforesaid examples.

Prior to this invention, it was known that cationic surface active agents and anionic surface active agents when together in aqueous solution resulted in the production or formation of water-insoluble compounds; and that adding an anionic surface active agent to an aqueous solution of another anionic surface active agent resulted in a mere physical combination of said agents and that no reaction would occur between them.

Said compounds of Formula I normally behave anionically in aqueous solutions having a pH above 7, and consequently it was expected that when in aqueous solution together with anionic surface agents that they would be combined physically only and that no other reaction would occur therebetween. In the course of my experimentations, I have discovered that said compounds of Formula I could be reacted with certain anionic surface active agents at a pH above 7 to produce water-soluble reaction products. Not only did I make said discovery, but I further discovered that water solutions of such reaction products had viscosities greater than corresponding aqueous solutions of the compounds of Formula I and also exhibited better foaming characteristics than did said compounds of Formula I in very low dilutions under extreme water hardness conditions. Said reaction products are non-toxic and non-irritating to the human skin. They have been found eminently useful as general utility detergents, such as for car washing, dish washing, clothes washing, etc.

According to this invention, one or a combination of two or more of said compounds of Formula I of the general structural Formula I are reacted with one or a combination of two or more anionic surface active agents of the following general structural Formula II to provide novel, water-soluble compounds having the following general structural Formula III, and having high wetting, detergency and surface active properties and capable of providing voluminous and stable foams in aqueous solution, and which aqueous solutions are substantially non-irritating to the skin and eyes of normal human beings.

*Formula II*

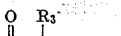

*Formula III*

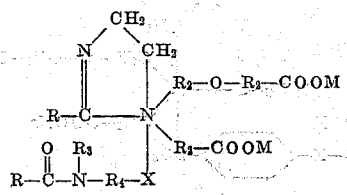

wherein $R_3$ is hydrogen, aliphatic hydrocarbon radicals of 1-8 carbon atoms, or such hydrocarbon radicals having one or more of the hydrogen atoms thereof substituted by one or more hydroxy groups, or said unsubstituted or said substituted hydrocarbon radicals having one or more ether linkages (—O—) therein; $R_4$ is an organic group selected from the class consisting of aliphatic, aromatic and aliphatic-aromatic hydrocarbon groups of 1-12 carbon atoms; said hydrocarbon groups of 1-12 carbon atoms with one or more of the hydrogen atoms thereof being substituted by a hydroxy group; said unsubstituted or substituted hydrocarbon groups having one or more ether linkages therein; and said aliphatic hydrocarbon groups having a —CONH— linkage therein; X is ($SO_3$) or (O—$SO_3$); M is an alkali metal or its equivalent and preferably sodium or potassium; and R has heretofore been defined in Formula I, as was $R_2$.

According to this invention, I react a compound of Formula I with a compound of Formula II to provide the novel and highly useful compounds of Formula III. In general this reaction is carried out in a solution containing compounds I and II and to which a quantity of an acidic agent such as a strong mineral acid, as for example hydrochloric, sulphuric or its equivalent has been added to lower the pH of the solution to a value of approximately 7 to approximately 9 and while maintaining the mass at a temperature between approximately 100°-200° F. In this reaction under the aforesaid conditions, compounds of Formula III are produced and have high water-solubility despite the fact that R is at least 4 carbon atoms. Such compounds of Formula III have unexpectedly high water-solubility, while corresponding salts of cationic compounds are water-insoluble. The resultant solution can be used directly as a surface active agent, wetting agent or detergent for the purposes indicated for the "cycloimidates." While the quantities of the compound of Formula I and compound of Formula II may be equimolecular for good yield of compounds of Formula III, I may employ an excess of either and in general the mole ratio for compound of Formula I to compound of Formula II may be 2 moles of the former to 1-3 moles of the latter.

One of the specific methods which I prefer to employ in carrying out an aspect of this invention is to first dissolve a compound of Formula I in water and then the pH thereof is adjusted to approximately 12-13 (measured electrically) by the addition of aqueous caustic soda if required. The temperature of said solution is raised to 100°-200° F. and preferably in factory practice to 140° F. Then a quantity of a compound of Formula II is dissolved in water in a separate container and this solution is added to said first solution and the mass is maintained in said temperature range while being constantly stirred and an acidic agent is added threreto to reduce the pH thereof to a value below 10 and in the range of approximately 7 to 9, and preferably of approximately 8.2 to approximately 8.7. At the end of the acidic agent addition, the stirring is continued and the temperature of the mass maintained for about 10-20 minutes after which the solution is allowed to cool and is a finished product.

The following are specific examples merely given by way of illustrating the invention and are not to be taken by way of limitation, all parts being given by weight unless otherwise specified.

EXAMPLE 1

An aqueous solution of 480 parts of product A in 720 parts of water is heated approximately 140° F. and its pH adjusted to 12-13 (measured electrically) by the addition of aqueous caustic soda. While being constantly stirred and maintained at that temperature there is added a solution of 400 parts of sodium salt of lauroyl monoethanolamide sulfate:

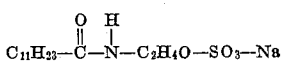

in 600 parts of water. Then while stirring and temperature is maintained there is added thereto between about 30–40 parts of hydrochloric acid solution (32%) whereby the pH of the mass is lowered to a value in the range of 8.2 to 8.7. Stirring is continued and the temperature maintained for about 10 minutes more. The resultant product is a solution of the novel reaction product having the following formula:

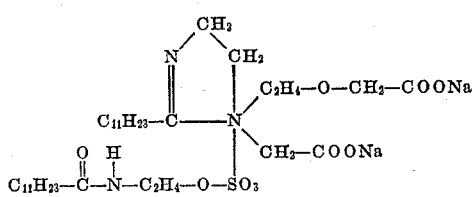

EXAMPLE 2

Employ the same procedure and components as set forth in Example 1 except that only 200 parts of the lauroyl monoethanolamide sulfate are used. In this instance the resultant product is a solution of the reaction product whose structural formula is shown in Example 1 together with unreacted product A used, in the approximate proportion of 2 parts of the former to 1 of the latter.

Employ the same procedure as that set forth in Example 1, but employ the components indicated in the following Examples 3–18; the quantity of hydrochloric acid solution (32%) is variable to lower the pH to values indicated in Example 1 to obtain the reaction products of said Examples 3–18.

EXAMPLE 3

480 parts of product A in 720 parts of water. 400 parts of lauryl taurate sodium salt:

FORMULA OF NOVEL REACTION PRODUCT

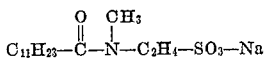

in 600 parts of water.

FORMULA OF NOVEL REACTION PRODUCT

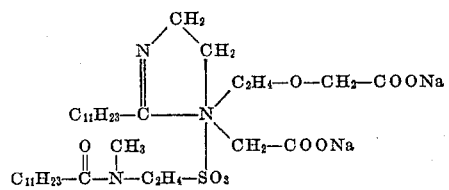

EXAMPLE 4

450 parts of product C in 800 parts of water. 450 parts of oleyl diethanolamide sulfate sodium salt:

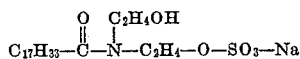

in 550 parts of water.

FORMULA OF REACTION PRODUCT

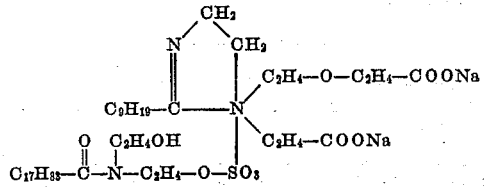

EXAMPLE 5

525 parts of product B in 950 parts of water. 400 parts of lauroyl triethoxyetheramide sulfate sodium salt:

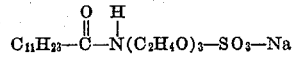

in 600 parts of water.

FORMULA OF REACTION PRODUCT

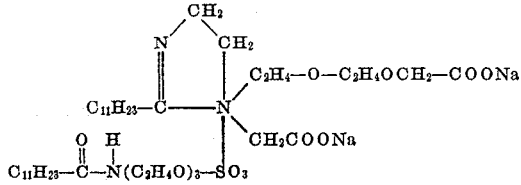

EXAMPLE 6

480 parts of product A in 720 parts of water. 400 parts of lauroyl amidodiethoxyetherethanolmonosulfate sodium salt:

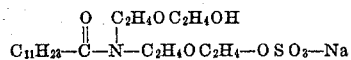

in 600 parts of water.

FORMULA OF REACTION PRODUCT

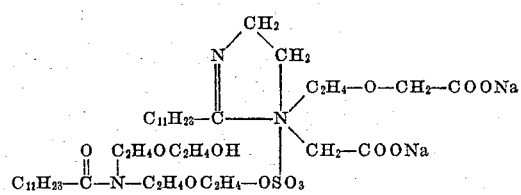

EXAMPLE 7

600 parts of product F dissolved in 900 parts of water. 400 parts lauryl amidoethylamidoacetylsulfate sodium salt:

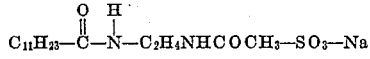

dissolved in 600 parts of water.

FORMULA OF REACTION PRODUCT

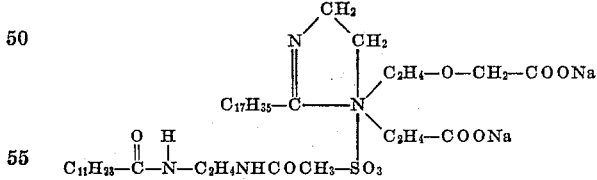

EXAMPLE 8

525 parts of product H dissolved in 800 parts of water. 300 parts of lauryl sulfanilamide sodium salt:

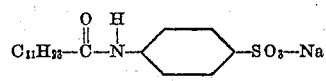

dissolved in 450 parts of water.

FORMULA OF REACTION PRODUCT

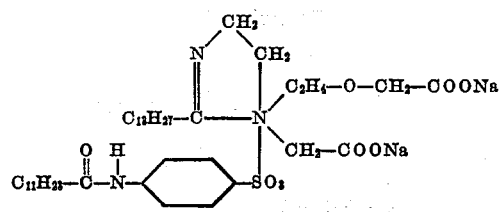

EXAMPLE 9

480 parts of product A in 720 parts of water. 350 parts of lauryl amido methyl methylphenyl sulfonate sodium salt:

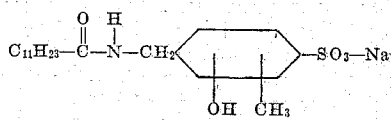

dissolved in 500 parts of water.

FORMULA OF REACTION PRODUCT

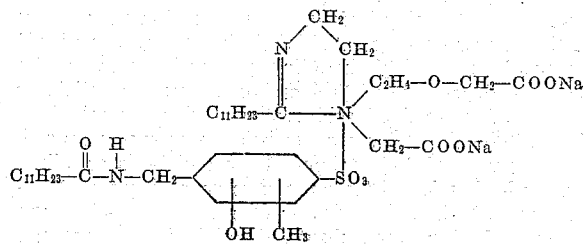

EXAMPLE 10

480 parts of product A in 720 parts of water. 325 parts of stearoyl amido propanone ethyl sulfate sodium salt:

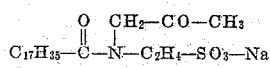

in 500 parts of water.

FORMULA OF REACTION PRODUCT

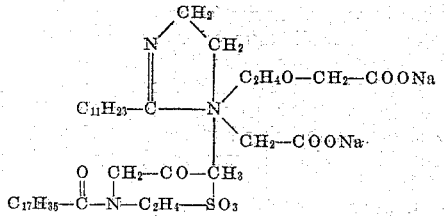

EXAMPLES 11-18

Employing the same procedure as that set forth in Example 1, but using 1 mole of products D, E, G, I, J, K, L, and M respectively and 1 mole of the sodium salt of lauroyl monoethanol amide sulfate, there are produced 8 other novel compounds, which differ from the novel reaction product of Example 1 in either R or R₂ or both.

It is also to be understood that any of the products A—M, which are shown herein merely as illustrative examples of the starting materials of Formula I may be reacted with any of the specific sulfate or sulfonate salts which are shown herein merely as illustrative examples of reactants of Formula II to produce novel compounds of Formula III.

It is to be understood that when either $SO_3$ or $OSO_3$ is used in the specification or claims, it is meant to indicate either one or the other because of their obvious equivalency; it is also to be understood that the use of Na in the specification and claims is meant to indicate any of the other alkali metals because of their obvious equivalency; and it is also to be understood that the CONH linkage when part of $R_4$ in the specification and claims is meant to indicate either it or NHCO because of their obvious equivalency.

It is also to be understood that instead of first adjusting the pH of the compound of Formula I to 12–13 before the addition of the compound of Formula II, any other method may be employed to obtain the condition whereby the pH of the solution of I and II is at least 10 and preferably 10.5–11 before the addition of the acidic agent to lower the pH of the mass to approximately 7 to approximately 9. For example, I and II may be dissolved together and this solution may by the addition of caustic soda when required have its pH adjusted to at least 10, and then at 100°–200° F. is ready for the addition of the acidic agent to lower its pH to approximately 7 to approximately 9. If desired, the required amount of acidic agent may be added either before or after the solution at pH of at least 10 is brought to a temperature in the range of 100–200° F.

Since certain changes in carrying out the aforesaid processes and certain modifications in the compositions which embody the invention may be made without departing from its scope, it is intended that all matter contained in the description shall be interpreted as illustrative and not in a limiting sense.

It is also to be understood that the following claims are intended to cover all the generic and specific features of the invention herein described, and all statements of the scope of the invention which as a matter of language might be said to fall therebetween.

I claim:

1. A novel compound of the following formula:

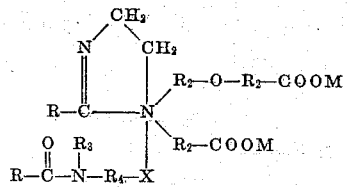

in which R is a hydrocarbon radical of 4–18 carbon atoms; $R_2$ is selected from the class consisting of (a) aliphatic hydrocarbon groups of 1–4 carbon atoms, (b) hydroxy substituted hydrocarbon groups of 1–4 carbon atoms, (c) aliphatic ether groups, each of said groups having a single ether linkage therein and otherwise being hydrocarbon of 2–4 carbon atoms, (d) aliphatic ether groups, each of said groups having a single ether linkage therein and otherwise being hydroxy substituted hydrocarbon of 2–4 carbon atoms, (e) aliphatic keto groups, each of said groups having a single keto linkage therein and otherwise being hydrocarbon of 2–4 carbon atoms, (f) aliphatic keto groups, each of said groups having a single keto linkage therein and otherwise being hydroxy substituted hydrocarbon of 2–4 carbon atoms; and M is an alkali metal; $R_3$ is selected from the class consisting of (g) hydrogen, (h) aliphatic hydrocarbon radicals of 1–8 carbon atoms, (i) hydroxy substituted aliphatic hydrocarbon radicals of 1–8 carbon atoms, (j) aliphatic ether radicals, each having at least one ether linkage therein and otherwise being hydrocarbon of 2–8 carbon atoms, (k) aliphatic ether radicals, each of said radicals having at least one ether linkage therein and otherwise being hydroxy substituted hydrocarbon of 2–8 carbon atoms; $R_4$ is selected from the class consisting of (l) aliphatic hydrocarbon groups of 1–12 carbon atoms, (m) hydroxy substituted hydrocarbon groups of 1–12 carbon atoms, (n) aliphatic ether groups, each of said groups having at least one ether linkage therein and otherwise being hydrocarbon of 2–12 carbon atoms, (o) aliphatic ether groups, each of said groups having at least one ether linkage therein and otherwise being hydroxy substituted hydrocarbon of 2–12 carbon atoms, (p) aliphatic groups having a CONH linkage therein and otherwise being hydrocarbon of 2–12 carbon atoms; and X is selected from the group consisting of $SO_3$ and $OSO_3$.

2. A novel compound of the following formula:

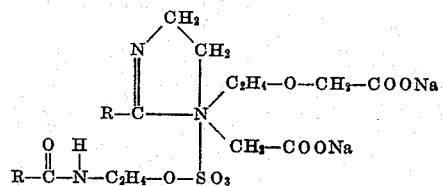

in which R is a hydrocarbon radical of 4–18 carbon atoms.

3. A novel compound of the following formula:

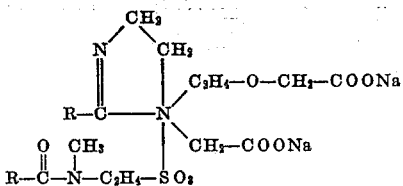

in which R is a hydrocarbon radical of 4–18 carbon atoms.

4. A novel compound of the following formula:

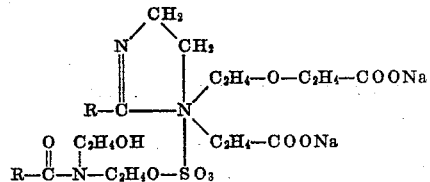

in which R is a hydrocarbon radical of 4–18 carbon atoms.

5. A novel compound of the following formula:

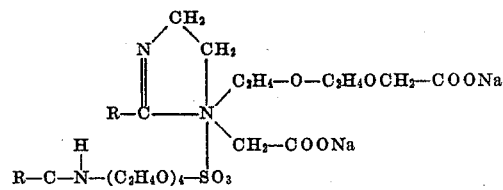

in which R is a hydrocarbon radical of 4–18 carbon atoms.

6. A novel compound of the following formula:

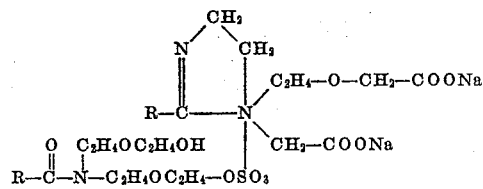

in which R is a hydrocarbon radical of 4–18 carbon atoms.

7. A novel compound of the following formula:

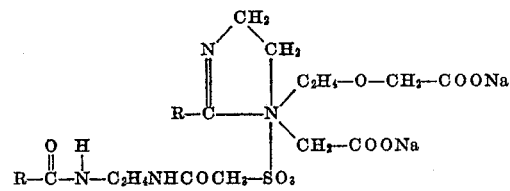

in which R is a hydrocarbon radical of 4–18 carbon atoms.

8. The method comprising under pH conditions of approximately 7 to approximately 9 reacting with each other compounds of the following Formulas I and II:

*Formula I*

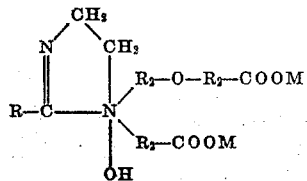

*Formula II*

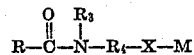

in which R is a hydrocarbon radical of 4–18 carbon atoms; $R_2$ is selected from the class consisting of (a) aliphatic hydrocarbon groups of 1–4 carbon atoms, (b) hydroxy substituted hydrocarbon groups of 1–4 carbon atoms, (c) aliphatic ether groups, each of said groups having a single ether linkage therein and otherwise being hydrocarbon of 2–4 carbon atoms, (d) aliphatic ether groups, each of said groups having a single ether linkage therein and otherwise being hydroxy substituted hydrocarbon of 2–4 carbon atoms, (e) aliphatic keto groups, each of said groups having a single keto linkage therein and otherwise being hydrocarbon of 2–4 carbon atoms, (f) aliphatic keto groups, each of said groups having a single keto linkage therein and otherwise being hydroxy substituted hydrocarbon of 2–4 carbon atoms; and M is an alkali metal; $R_3$ is selected from the class consisting of (g) hydrogen, (h) aliphatic hydrocarbon radicals of 1–8 carbon atoms, (i) hydroxy substituted aliphatic hydrocarbon radicals of 1–8 carbon atoms, (j) aliphatic ether radicals, each having at least one ether linkage therein and otherwise being hydrocarbon of 2–8 carbon atoms, (k) aliphatic ether radicals, each of said radicals having at least one ether linkage therein and otherwise being hydroxy substituted hydrocarbon of 2–8 carbon atoms; $R_4$ is selected from the class consisting of (l) aliphatic hydrocarbon groups of 1–12 carbon atoms, (m) hydroxy substituted hydrocarbon groups of 1–12 carbon atoms, (n) aliphatic ether groups, each of said groups having at least one ether linkage therein and otherwise being hydrocarbon of 2–12 carbon atoms, (o) aliphatic ether groups, each of said groups having at least one ether linkage therein and otherwise being hydroxy substituted hydrocarbon of 2–12 carbon atoms, (p) aliphatic groups having a CONH linkage therein and otherwise being hydrocarbon of 2–12 carbon atoms; and X is selected from the group consisting of $SO_3$ and $OSO_3$.

9. The method comprising to a solution containing a compound of Formula I and a compound of Formula II both defined in claim 8, adding a quantity of an acidic agent to lower the pH thereof to a value of approximately 7 to approximately 9 and maintaining the temperature of the mass between about 100° F. and 200° F.

10. The method comprising to a solution whose pH is at least 10 and containing a compound of Formula I and a compound of Formula II both defined in claim 8, adding a quantity of an acidic agent to lower the pH thereof to a value of approximately 7 to approximately 9 and maintaining the temperature of the mass between about 100° F. and 200° F.

11. The method defined in claim 8, with the mole ratio of compound of Formula I to compound of Formula II being 2 moles of the former to 1–3 moles of the latter.

12. The method defined in claim 9, with the mole ratio of compound of Formula I to compound of Formula II being 2 moles of the former to 1–3 moles of the latter.

13. The method defined in claim 10, with the mole ratio of compound of Formula I to compound of Formula II being 2 moles of the former to 1–3 moles of the latter.

No references cited.